(12) United States Patent
Tie et al.

(10) Patent No.: US 8,763,100 B2
(45) Date of Patent: *Jun. 24, 2014

(54) ENTITY AUTHENTICATION METHOD WITH INTRODUCTION OF ONLINE THIRD PARTY

(75) Inventors: Manxia Tie, Shaanxi (CN); Jun Cao, Shaanxi (CN); Xiaolong Lai, Shaanxi (CN); Zhenhai Huang, Shaanxi (CN)

(73) Assignee: China Iwncomm Co., Ltd. (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/392,915

(22) PCT Filed: Dec. 29, 2009

(86) PCT No.: PCT/CN2009/076181
§ 371 (c)(1),
(2), (4) Date: Feb. 28, 2012

(87) PCT Pub. No.: WO2011/022919
PCT Pub. Date: Mar. 3, 2011

(65) Prior Publication Data
US 2012/0167190 A1   Jun. 28, 2012

(30) Foreign Application Priority Data
Aug. 28, 2009   (CN) .......................... 2009 1 0023735

(51) Int. Cl.
*G06F 21/00*   (2013.01)
(52) U.S. Cl.
USPC .......... 726/7; 726/3; 726/10; 726/23; 380/46; 713/155; 713/168; 713/176
(58) Field of Classification Search
USPC ............. 726/5, 7, 19; 713/170, 172, 181, 178
See application file for complete search history.

(56) References Cited

U.S. PATENT DOCUMENTS 6,886,102 B1 * 4/2005 Lyle ................................. 726/23
7,155,608 B1   12/2006 Malik et al.
(Continued)

FOREIGN PATENT DOCUMENTS

| CN | 1297636 A | 5/2001 |
|---|---|---|
| CN | 1625103 | 6/2005 |

(Continued)

OTHER PUBLICATIONS

Akihiro Yamamura, "Safety Assessment of the JSO/IEC 9798 protocol," Gradate School of Engineering, Akita University Graduate School Resources, Feb. 4, 2011, Abstract translation provided by Unitalen Attorneys at Law.

(Continued)

*Primary Examiner* — Jason Lee
(74) *Attorney, Agent, or Firm* — DLA Piper LLP (US)

(57) ABSTRACT

An entity authentication method by introducing an online third party includes the following steps: 1) an entity B sends a message 1 to an entity A; 2) the entity A sends a message 2 to a trusted third party TP after receiving the message 1; 3) the trusted third party TP checks the validity of the entity A after receiving the message 2; 4) the trusted third party TP returns a message 3 to the entity A after checking the validity of the entity A; 5) the entity A sends a message 4 to the entity B after receiving the message 3; 6) and the entity B performs validation after receiving the message 4. The online retrieval and authentication mechanism of the public key simplifies the operating condition of a protocol, and realizes validity identification of the network for the user through the authentication of the entity B to the entity A.

6 Claims, 1 Drawing Sheet

(56) References Cited

U.S. PATENT DOCUMENTS

| | | |
|---|---|---|
| 7,266,684 B2 | 9/2007 | Jancula |
| 7,697,692 B2 | 4/2010 | Takata et al. |
| 8,195,935 B2 | 6/2012 | Tian et al. |
| 2002/0032654 A1 | 3/2002 | Egendorf |
| 2003/0190046 A1* | 10/2003 | Kamerman et al. .......... 380/286 |
| 2006/0053296 A1 | 3/2006 | Busboom et al. |
| 2007/0208941 A1 | 9/2007 | Backer |
| 2007/0289006 A1 | 12/2007 | Ramachandran et al. |
| 2011/0131640 A1* | 6/2011 | Canis et al. .................. 726/7 |

FOREIGN PATENT DOCUMENTS

| | | |
|---|---|---|
| CN | 1929350 | 3/2007 |
| CN | 1929380 A | 3/2007 |
| CN | 1949709 A | 4/2007 |
| CN | 101064605 | 10/2007 |
| CN | 101222328 A | 7/2008 |
| CN | 101247223 A | 8/2008 |
| CN | 101364876 A | 2/2009 |
| JP | 8-297638 | 11/1996 |
| JP | 8-335208 | 12/1996 |
| JP | 10-210023 | 8/1998 |
| JP | 2005535006 | 11/2005 |
| JP | 2006238273 | 9/2006 |
| JP | 2010-504669 | 2/2010 |
| JP | 2010-504670 | 2/2010 |
| JP | 2011-507363 | 3/2011 |
| JP | 2011-514082 | 4/2011 |
| WO | 03/100544 A2 | 12/2003 |
| WO | 2007131426 | 11/2007 |
| WO | 2009/076879 A1 | 6/2009 |

OTHER PUBLICATIONS

"Survey on Status of Identity Authentication Technologies," Security Center of Information-Technology Promotion Agency, Japan, Mar. 2003, Translation provided by Unitalen Attorneys at Law.

Tanaka, et al., "An Implementation and Evaluation for the Key Distribution Procedure Using ISDN User-to-User Signalings," D-I, vol. J78-D-I, No. 6, Jun. 1995, pp. 549-558 with English Abstract.

Oyaizu, et al., "Key Distribution Procedure using ISDN User-to-user Signalings," The Institute of Electronics, Infomration and Communication Engineers, Technical Report of Thice, Nov. 1992, pp. 19-24.

* cited by examiner

ENTITY AUTHENTICATION METHOD WITH INTRODUCTION OF ONLINE THIRD PARTY

This application is a U.S. National Stage of International Application No. PCT/CN2009/076181, filed 29 Dec. 2009, designating the United States, and claiming priority to Chinese Patent Application No. 200910023735.5, filed with the State Intellectual Property Office of the People's Republic of China on Aug. 28, 2009 and entitled "Entity authentication method with introduction of online third party", which is hereby incorporated by reference in its entirety.

FIELD OF THE INVENTION

The present invention relates to an entity authentication method and particularly to an entity authentication method with introduction of an online third party.

BACKGROUND OF THE INVENTION

An entity authentication method using an asymmetric cipher can be categorized into unidirectional authentication and bidirectional authentication. Uniqueness or temporality of authentication is identified with a time-varying parameter, which typically includes a time stamp, a sequence number, and a random number. If a time stamp or a sequence number is used as a time-varying parameter, message passing shall be used only once for the unidirectional authentication and twice for the bidirectional authentication; and if a random number is used as a time-varying parameter, message passing shall be used twice for the unidirectional authentication and three or four times for the bidirectional authentication (i.e., parallel authentications each with message passing for twice).

Regardless of authentication mechanism, a verifier has to be provided with a valid public key of an asserter prior to or during operation; otherwise an authentication process may be damaged or fail. Here, a bidirectional authentication method with message passing for three times is described as an example:

Referring to FIG. 1, there are tokens TokenAB=$R_A\|R_B\|B\|Text3\|sS_A$ ($R_A\|R_B\|B\|Text2$) and TokenBA=$R_B\|R_A\|A\|Text5\|sS_B$ ($R_B\|R_A\|A\|Text4$), where X represents an entity identifier, and there are two authentication entities A and B in the authentication system; $Cert_X$ represents a certificate of the entity X; $sS_X$ represents a signature of the entity X; $R_X$ represents a random number generated by the entity X; and Text represents an optional text field.

A process in which the authentication mechanism with message passing for three times operates is detailed as follows.

1) The entity B transmits the random number $R_B$ and the optional text Text1 to the entity A.

2) The entity A transmits the token TokenAB and the optional certificate $Cert_A$ to the entity B.

3) The entity B performs the following steps upon reception of the message transmitted from the entity A:

3.1) The entity B ensures possession of a valid public key of the entity A by checking the certificate of the entity A or otherwise; and 3.2) The entity B obtains the public key of the entity A and then verifies the signature of TokenAB in the step 2), checks the identifier B for correctness and examines the random number $R_B$ transmitted in the step 1) and the random number $R_B$ in TokenAB for consistency to thereby verify the entity A.

4) The entity B transmits the token TokenBA and the optional certificate $Cert_B$ to the entity A.

5) The entity A performs the following steps upon reception of the message including TokenBA transmitted from the entity B:

5.1) The entity A ensures possession of a valid public key of the entity B by checking the certificate of the entity B or otherwise; and 5.2) The entity A obtains the public key of the entity B and then verifies the signature of TokenBA in the step 4), checks the identifier A for correctness and examines the random number $R_A$ transmitted in the step 2) and the random number $R_A$ in TokenBA for consistency and the random number $R_B$ received in the step 1) and the random number $R_B$ in TokenBA for consistency to thereby verify the entity B.

As can be apparent, the authentication mechanism with message passing for three times has to ensure that each of the entities A and B possesses the valid public key of the other entity for successful operation, but neither how one party obtains the public key of the other party nor validity thereof has been mentioned in a protocol. This condition of guaranteeing a demand has not been satisfied in a variety of current application contexts. For example, a user access control function is typically performed with an entity authentication mechanism over a communication network in such a way that an access of a user to the network will not be allowed until the authentication mechanism is performed successfully, so it is impossible or difficult for the user to access a certificate institution to obtain validity of a public key of an opposite entity (a network access point) prior to authentication.

In an existing communication network, especially radio communication network, it is typically required to perform authentication between a user and a network access point to ensure both an access of a legal user to the network and an access of the user to a legal network, so the traditional entity authentication mechanism can be improved and good feasibility and usability thereof can be offered in a practical application if a network entity is not aware of a valid public key of an opposite communication entity prior to authentication but verifies the public key of the opposite entity during authentication.

SUMMARY OF THE INVENTION

The invention proposes an entity authentication method with introduction of an online third party to address the foregoing technical problem present in the prior art.

In a technical solution of the invention, the invention provides an entity authentication method with introduction of an online third party, which includes the steps of:

1) transmitting, by an entity B, to an entity A a message 1 including a random number $R_B$ and an optional text Text1;

2) transmitting, by the entity A, to a trusted third party TP a message 2 including the random number $R_B$, an identity $I_A$ and an optional text Text2 upon reception of the message 1;

3) examining, by the trusted third party TP, the entity A for legality against the identity $I_A$ upon reception of the message 2;

4) returning, by the trusted third party TP, to the entity A a message 3 including an entity verification result $Res_A$, a token TokenTA and an optional text Text4 after examining the entity A for legality;

5) transmitting, by the entity A, to the entity B a message 4 including the entity verification result $Res_A$, the token TokenTA and a token TokenAB upon reception of the message 3; and 6) verifying, by the entity B, upon reception of the message 4.

The step 6) includes:

6.1) verifying a signature of the trusted third party TP in TokenTA and examining the random number $R_B$ generated by the entity B in the message 1 and the random number $R_B$ in the signature of the trusted third party TP included in TokenTA for consistency, and performing a step 6.2) if the verification is passed;

6.2) obtaining the verification result $Res_A$ of the entity A, and performing a step 6.3) if the entity A is legally valid; otherwise, ending; and 6.3) obtaining a public key of the entity A, verifying a signature of the entity A in TokenAB, examining the random number $R_B$ generated by the entity B in the message 1 and the random number $R_B$ in the signature of the entity A included in TokenAB for consistency, and finishing, by the entity B, authentication of the entity A if the verification is passed.

Examining the entity A for legality in the step 3) comprises: in the message 2, if the identity $I_A$ of the entity A is an identifier A of the entity A, searching for, by the trusted third party TP, a valid public key $PublicKey_A$ of the entity A; or if the identity $I_A$ of the entity A is a certificate $Cert_A$ of the entity A, examining, by the trusted third party TP, the certificate $Cert_A$ for validity $Valid_A$.

The random number $R_B$ can be replaced with time stamps or sequence numbers.

The token fields are:

TokenTA=$sS_T(R_B\|Res_A\|Text3)$

TokenAB=Text6$\|I_A\|sS_A(A\|R_B\|Res_A\|$TokenTA$\|$Text5).

In the tri-entity architecture adopted in the invention, an authentication entity shall obtain a public key or a certificate of a trusted third party and a user certificate distributed thereto from the trusted third party or submit its own public key to the trusted third party for safekeeping prior to authentication without being aware in advance of a valid public key of an opposite authentication entity. During operation of a protocol, the public key of the authentication entity and validity thereof can be transported automatically to the opposite end in need of them through searching and verification at the trusted third party. As compared with the traditional authentication mechanism, the invention discloses a public key online retrieval and authentication mechanism in which the public keys are managed centrally and an operation condition of the protocol is simplified to facilitate an application and implementation thereof.

DETAILED DESCRIPTION OF THE EMBODIMENTS

The method according to the embodiment of the invention involves three entities including two authentication entities A and B and a Trusted third Party (TP) which is a trusted third party of the authentication entities A and B and provides the entities A and B with an authentication service. Such a system in which peer authentication between the two entities A and B is performed through the trusted third party TP is referred to as a Tri-element Peer Authentication (TePA) system.

Symbols are Defined Below for the Sake of Convenience:

$Valid_X$ represents validity of a certificate $Cert_X$; $PublicKey_X$ represents a public key of an entity X (X represents A or B); $I_X$ represents an identity of the entity X and is represented as the certificate $Cert_X$ or an identifier X of the entity; $Res_X$ represents the verification result of the entity X and is composed of the certificate $Cert_X$ and validity thereof $Valid_X$ or of the entity X and the public key thereof $PublicKey_X$; and Token represents a token field.

Figure 1:
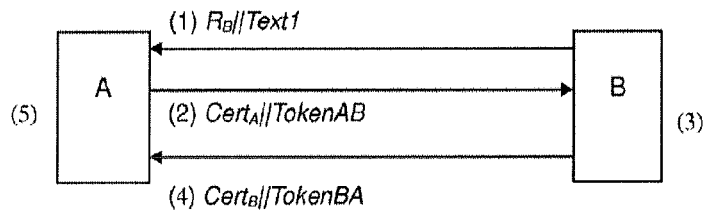
FIG. 1 is a schematic diagram of authentication in an authentication mechanism with message passing for three times in the prior art.
Figure 2:
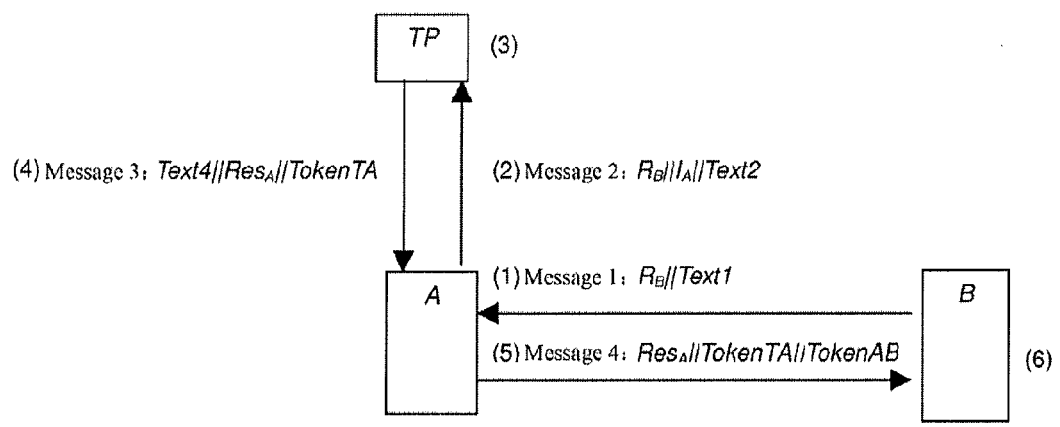
FIG. 2 is a schematic diagram of a method according to an embodiment of the invention.

Referring to FIG. 2, token fields of the embodiment of the invention are defined below:

TokenTA=$sS_T(R_B\|Res_A\|Text3)$

TokenAB=Text6$\|I_A\|sS_A(A\|R_B\|Res_A\|$TokenTA$\|$Text5)

A flow in which the entity B authenticates the entity A is as follows.

1) The entity B intending to authenticate the entity A transmits to the entity A a message 1 including a random number $R_B$ and an optional text Text1

2) The entity A transmits to the trusted third party TP a message 2 including the random number $R_B$, an identity $I_A$ and an optional text Text2 upon reception of the message 1.

3) The trusted third party TP examines the entity A for legality against the identity $I_A$ upon reception of the message 2:

in the message 2, if the identity $I_A$ of the entity A is an identifier A of the entity A, the trusted third party TP searches for a valid public key $PublicKey_A$ of the entity A; or if the identity $I_A$ of the entity A is a certificate $Cert_A$ of the entity A, the trusted third party TP examines the certificate $Cert_A$ for validity $Valid_A$.

4) The trusted third party TP returns to the entity A a message 3 including an entity verification result $Res_A$, a token Token TA and an optional text Text4 after examining the entity A for legality.

5) The entity A transmits to the entity B a message 4 including the entity verification result $Res_A$, the token TokenTA and a token TokenAB upon reception of the message 3.

6) The entity B performs verification upon reception of the message 4:

6.1) The entity B verifies a signature of the trusted third party TP in Token TA and examines the random number $R_B$ generated by the entity B in the message 1 and the random number $R_B$ in the signature of the trusted third party TP included in Token TA for consistency, and the step 6.2) is performed if the verification is passed;

6.2) The entity B obtains the verification result $Res_A$ of the entity A, and the step 6.3) is performed if the entity A is legally valid; otherwise, the flow ends; and 6.3) The entity B obtains the public key of the entity A, verifies a signature of the entity A in TokenAB, examines the random number $R_B$ generated by the entity B in the message 1 and the random number $R_B$ in the signature of the entity A included in TokenAB for consistency, and if the verification is passed, the entity B finishes authentication of the entity A.

The random number $R_B$ may be replaced with time stamps or sequence numbers.

In a practical application, this authentication system is typically applied in such a way that the entity B resides on a communication user equipment and the entity A resides on a network access point, and with the method for authentication between the entity A and the entity B in the foregoing embodiment, a user can authenticate the legality of the network access point to ensure legality of a network accessed by the user.

The invention claimed is:

1. An entity authentication method with introduction of an online third party, comprising the steps of:
   1) transmitting, by an entity B, to an entity A a message 1 comprising a random number $R_B$ and an optional text Text1;
   2) transmitting, by the entity A, to a trusted third party TP a message 2 comprising the random number $R_B$, an identity $I_A$ and an optional text Text2 upon reception of the message 1;
   3) examining, by the trusted third party TP, the entity A for legality against the identity $I_A$ upon reception of the message 2;
   4) returning, by the trusted third party TP, to the entity A a message 3 comprising an entity verification result $Res_A$, a token TokenTA and an optional text Text4 after examining the entity A for legality;
   5) transmitting, by the entity A, to the entity B a message 4 comprising the entity verification result $Res_A$, the token TokenTA and a token TokenAB upon reception of the message 3; and
   6) verifying, by the entity B, upon reception of the message 4,
   wherein the step 6) comprises:
   6.1) verifying a signature of the trusted third party TP in TokenTA and examining the random number $R_B$ generated by the entity B in the message 1 and the random number $R_B$ in the signature of the trusted third party TP comprised in TokenTA for consistency, and performing a step 6.2) if the verification is passed;
   6.2) obtaining the verification result $Res_A$ of the entity A, and performing a step 6.3) if the entity A is legally valid; otherwise, ending; and
   6.3) obtaining a public key of the entity A, verifying a signature of the entity A in TokenAB, examining the random number $R_B$ generated by the entity B in the message 1 and the random number $R_B$ in the signature of the entity A comprised in TokenAB for consistency, and finishing, by the entity B, authentication of the entity A if the verification is passed; and
   wherein the entity A and the entity B include a transmitter to transmit messages and a receiver to receive messages.

2. The entity authentication method with introduction of an online third party according to claim 1, wherein examining the entity A for legality in the step 3) comprises: in the message 2, if the identity $I_A$ of the entity A is an identifier A of the entity A, searching for, by the trusted third party TP, a valid public key $PublicKey_A$ of the entity A; or if the identity $I_A$ of the entity A is a certificate $Cert_A$ of the entity A, examining, by the trusted third party TP, the certificate $Cert_A$ for validity $Valid_A$.

3. The entity authentication method with introduction of an online third party according to claim 1, wherein the random number $R_B$ is replaced with time stamps or sequence numbers.

4. The entity authentication method with introduction of an online third party according to claim 1, wherein the token fields are:

$$Token\ TA = sS_T(R_B\|Res_A\|Text3)$$

$$TokenAB = Text6\|I_A\|sS_A(A\|R_B\|Res_A\|TokenTA\|Text5),$$

wherein $sS_T$ represents a signature of the trusted third party TP, Text3, Text5 and Text6 are optional texts, and "||" is a concatenation symbol.

5. The entity authentication method with introduction of an online third party according to claim 2, wherein the token fields are:

$$TokenTA = sS_T(R_B\|Res_A\|Text3)$$

$$TokenAB = Text6\|I_A\|sS_A(A\|R_B\|Res_A\|TokenTA\|Text5),$$

wherein $sS_T$ represents a signature of the trusted third party TP, Text3, Text5 and Text6 are optional texts, and "||" is a concatenation symbol.

6. The entity authentication method with introduction of an online third party according to claim 3, wherein the token fields are:

$$TokenTA = sS_T(R_B\|Res_A\|Text3)$$

$$TokenAB = Text6\|I_A\|sS_A(A\|R_B\|Res_A\|TokenTA\|Text5),$$

wherein $sS_T$ represents a signature of the trusted third party TP, Text3, Text5 and Text6 are optional texts, and "||" is a concatenation symbol.

* * * * *